United States Patent [19]

Bird

[11] 4,030,022

[45] June 14, 1977

[54] PHASE-CONTROLLED CYCLOCONVERTERS

[75] Inventor: Brian Michael Bird, Bristol, England

[73] Assignee: National Research Development Corporation, England

[22] Filed: May 29, 1975

[21] Appl. No.: 581,755

[30] Foreign Application Priority Data

June 3, 1974 United Kingdom ............ 24430/74

[52] U.S. Cl. .............................. 321/69 R; 307/261
[51] Int. Cl.² ........................................ H02M 5/27
[58] Field of Search ............... 307/227, 261; 321/7, 321/65, 66, 69 R; 328/13, 15, 28

[56] References Cited

UNITED STATES PATENTS

| | | | |
|---|---|---|---|
| 3,256,244 | 6/1966 | Byloff et al. ................ | 321/69 R |
| 3,479,528 | 11/1969 | Fisher ........................ | 307/227X |
| 3,603,867 | 9/1971 | Cuenoud .................... | 321/69 R |
| 3,851,260 | 11/1974 | Colin ......................... | 307/227 X |

*Primary Examiner*—A. D. Pellinen
*Attorney, Agent, or Firm*—Larson, Taylor and Hinds

[57] ABSTRACT

A thyristor cycloconverter for frequency changing a 3-phase input supply to, commonly, a single-phase or 3-phase output supply. The output frequency can be near to, and even higher than, the input frequency without intolerable harmonics. A local oscillator generates a reference wave of output frequency, single-phase or 3-phase. Each reference wave is regularly sampled, twice each input supply cycle, and the sampled value stored to provide a step-form modified reference wave. Thyristor firing pulse trains are generated, during the period of the appropriate input supply commutation intervals, following the instants of amplitude equality of each step-form modified reference wave and each supply phase. A comparator provides a pulse output during alternate successive wave crossings. Output supply positive half-cycle thyristor firing pulse trains commence from the pulse trailing edges and negative half-cycle thyristor firing pulse trains commence from the pulse leading edges. Output supply frequency and amplitude are controlled according to frequency and amplitude of the reference waves.

9 Claims, 9 Drawing Figures

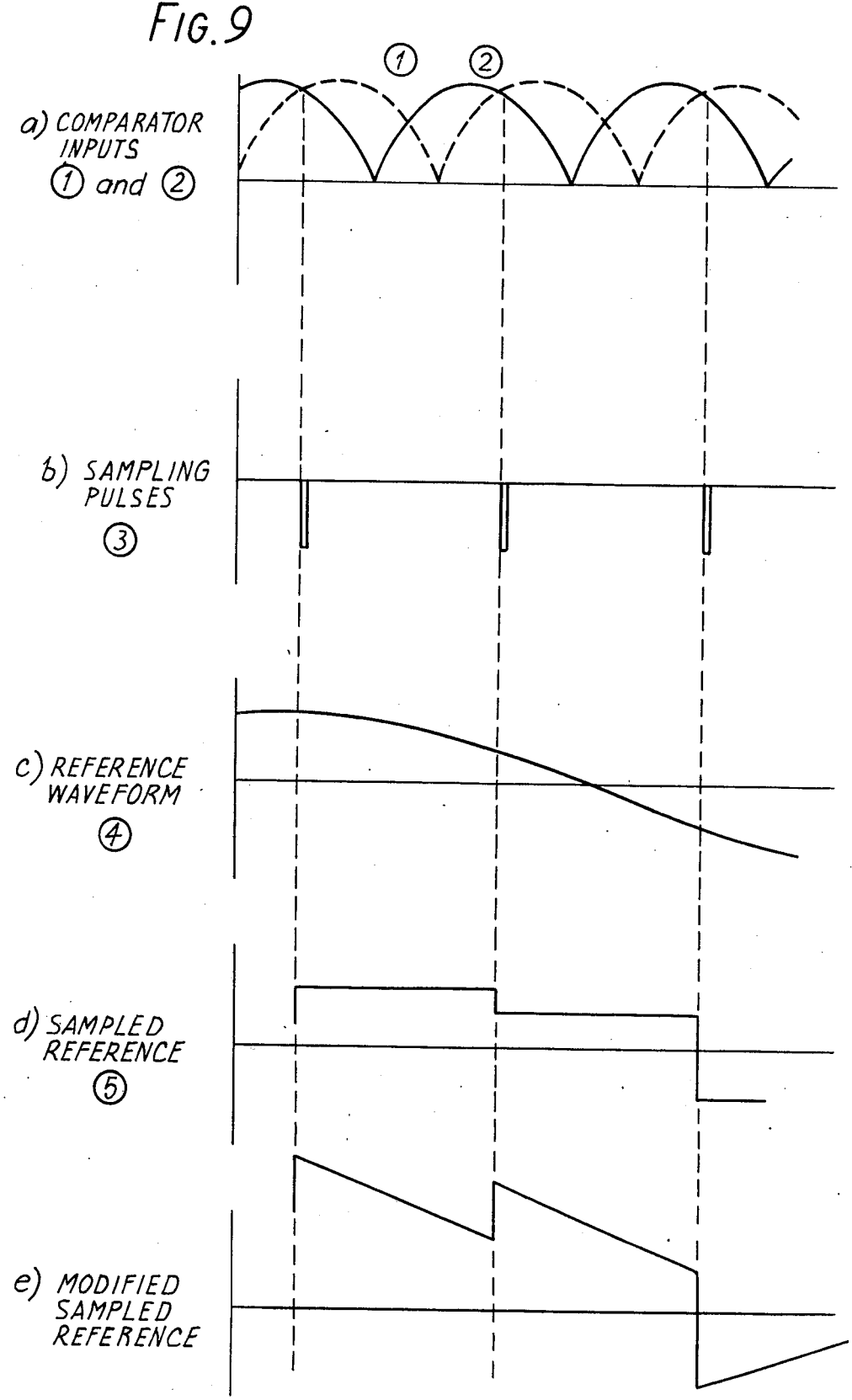

PHASE-CONTROLLED CYCLOCONVERTERS

This invention relates to phase-controlled cycloconverters.

Phase-controlled cycloconverters are known for changing the frequency of single-phase, 3-phase or poly-phase alternating current derived from an a.c. mains supply, without intermediate rectification to provide d.c. and without the use of rotating machinery.

In known phase-controlled cycloconverters, the output frequency has been limited to a fraction of the input supply frequency. In one typical use, an output a.c. current of 16.⅔ Hz. is derived from a 50 Hz. mains supply input.

The object of the present invention is to provide an improved method of controlling the switching means used in a cycloconverter and to provide improved apparatus using the improved method whereby an output a.c. may be provided of frequency more nearly equal to the supply frequency.

The method can, indeed, be employed to provide an output a.c. of frequency higher than the mains supply frequency, although normally a lower frequency output a.c. will be derived.

In the field of radio-frequency engineering, it is well-known that a sinusoidal a.c. wave can be reproduced knowing the amplitude values of the wave at a number of sufficiently closely-spaced intervals of time and wave-amplitude sampling techniques and wave generating circuits are used in this field.

Two modes of sampling are commonly used: natural sampling and regular sampling. By natural sampling, the wave to be sampled and reproduced is examined at irregularly-spaced intervals of time. By regular sampling, the sampling process is at equally-spaced intervals of time.

In a method according to the present invention, regular sampling is used.

In cycloconverters, the power of the output a.c. current is obtained from an a.c. supply mains, of supply frequency. The frequency of the output a.c. current, however, is determined by a reference waveform of chosen output frequency, which is normally a locally-generated low-power control wave, which is supplied to the cycloconverter control circuits.

It is well-known that in practice the output a.c. waveform is not a faithful reproduction of the control waveform, but is a distorted sinusoidal waveform which may be analysed into a pure sinusoidal waveform of the control-wave frequency together with a number of unwanted waves superimposed thereon and of frequencies both higher than and lower than the required output frequency.

For many practical uses of cycloconverter derived a.c., the presence of spurious waves, particularly those of lower frequency than the required output frequency, is most undesirable. In known cycloconverters, the amplitude of such lower-frequency wave components tends to be high and, since the effect of increasing the output frequency above a small fraction of the input frequency greatly increases the low-frequency spurious wave content of the output a.c., this characteristic of known cycloconverters has limited the maximum practical output a.c. frequencies in the past.

Accordingly, one form of the present invention provides a method of control of cycloconverter switching means, for converting electrical power from an input, 3-phase alternating current supply of input frequency to an output alternating current supply of output frequency different from said input frequency, comprising generating a sinusoidal reference wave of said output frequency for each phase of said output supply, sampling the amplitude of each said reference wave at the instants of amplitude equality of each pair of the input supply phases, storing the value of each sampled amplitude during the next following 180°, at supply frequency, to provide a modified reference wave of step-form amplitude and providing a conduction initiating pulse for said switching means at each amplitude equality of each said modified reference wave and each input supply wave.

Another form of the present invention provides cycloconverter apparatus comprising input terminals for an input 3-phase alternating current supply of input frequency, output terminals for providing an output alternating current supply of output frequency different from said input frequency, a sine wave generator for generating a reference wave of said output frequency, for each phase of said output supply, first voltage comparator means for determining first instants of amplitude equality, of each input supply phase compared with each other supply phase, sampling means for sampling the voltage amplitude of each of said reference waves at said instants of equality of each pair of supply phases, voltage storage means for storing each sampled amplitude during the next following 180°, at supply frequency thereby to provide a modified reference wave of step-form amplitude switching means for controlling current flow from each of the input supply phases, for the negative half-cycles and for the positive half-cycles of each phase of the output alternating current, respectively, said switching means being controlled for current conduction by the application of firing pulses thereto, second voltage comparator means for determining second instants of amplitude equality, of each input supply phase and each said modified reference wave, and pulse generating means for generating firing pulses at said second instants of amplitude equality.

In order that the invention may be readily carried into practice, the method of the invention and practical embodiments of apparatus according to the invention will now be described in detail, the latter by way of example, with reference to the accompanying drawings, in which:

FIG. 9 is a diagram showing waveforms referred to in the description of regular sampling circuits of FIG. 8

FIG. 1 is a schematic circuit diagram showing the power circuitry of a 3-phase, 3-pulse cycloconverter. This circuit uses 18 thyristors, referenced 1 to 18 in the drawing, and arranged in half-wave configuration in three output phases I, II and III.

In each output phase, the thyristors 1, 2 and 3 and the lower referenced numbered trio of the phases II and III control the positive half-cycles of the output 3-phase currents and the thyristors 4, 5 and 6 and the higher referenced numbered trio of the phases II and III control the negative half-cycles, as shown by the refernce letters "P" and "N", respectively.

All the thyristors draw current from a 3-phase input supply A, B and C to lines 19, 20 and 21, respectively. In each half-wave trio of thyristors, the lowest numbered is connected to line 19 and the middle and highest numbered to lines 20 and 21, respectively.

Between the positive and negative half-wave trios of thyristors of output phases I, II and III is connected a centre-tapped circulating-current reactor, referenced 22, 23 and 24 respectively to limit the flow of circulating current in each phase.

The centre-taps of the reactors 22, 23 and 24 are connected respectively to the phase I, phase II and phase III loads, 25, 26 and 27 respectively, which loads are star-connected from a common line 28.

The waveform of each output phase of the cycloconverter arrangement shown is fabricated from the supply waveform of all three input phases. This is effected by control of firing pulses applied to the gates of the six thyristors controlling each output phase.

The power circuitry for each phase is identical, as is also the control circuitry for each. Each output phase is, however, controlled from a separate phase of a 3-phase, reference-voltage generator.

Figure 1:
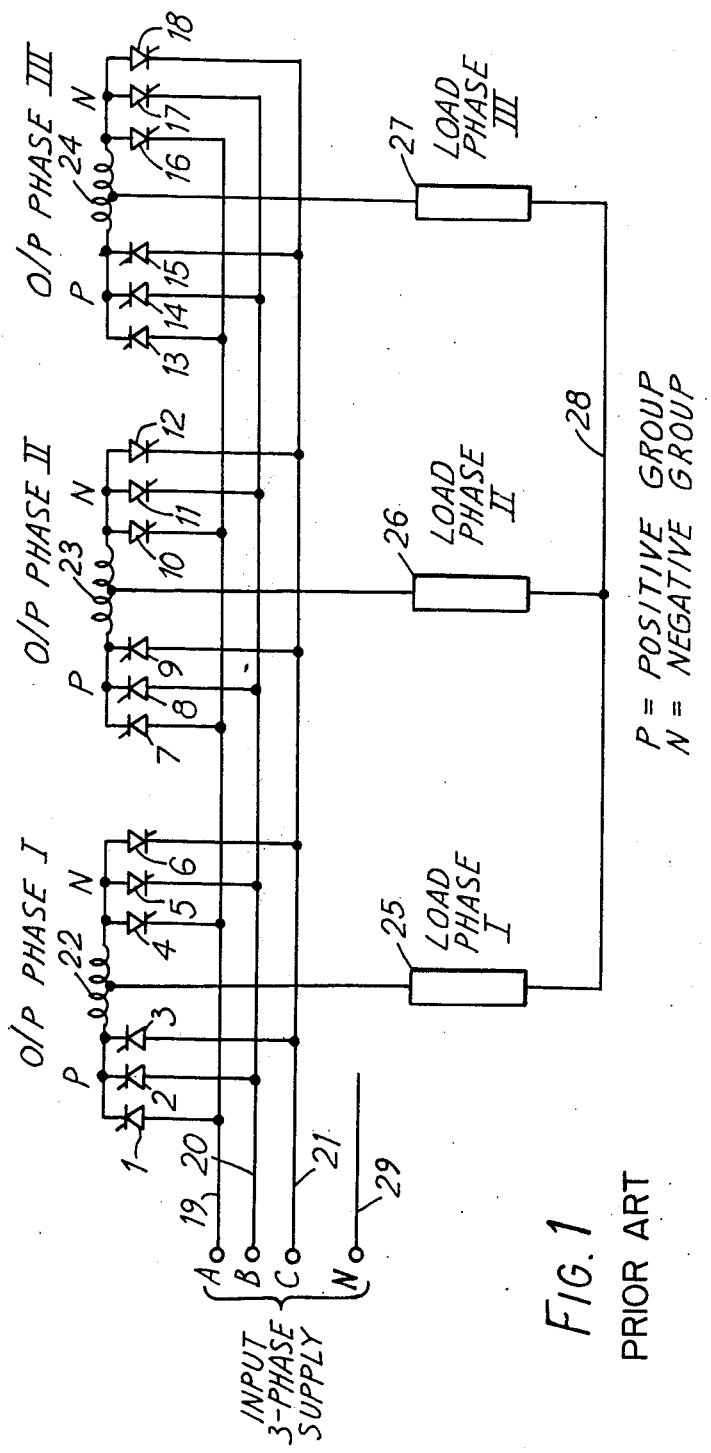
FIG. 1 is a schematic circuit diagram of a 3-phase, 3-pulse cycloconverter, as used in a cycloconverter of the present invention, but showing only those portions similar to typical known arrangements.

The circuit arrangement of FIG. 1, which is embodied in apparatus according to the invention, is a typical known cycloconverter circuit. The improvement of the present invention resides in the further apparatus used for controlling the thyristors.

Figure 2:
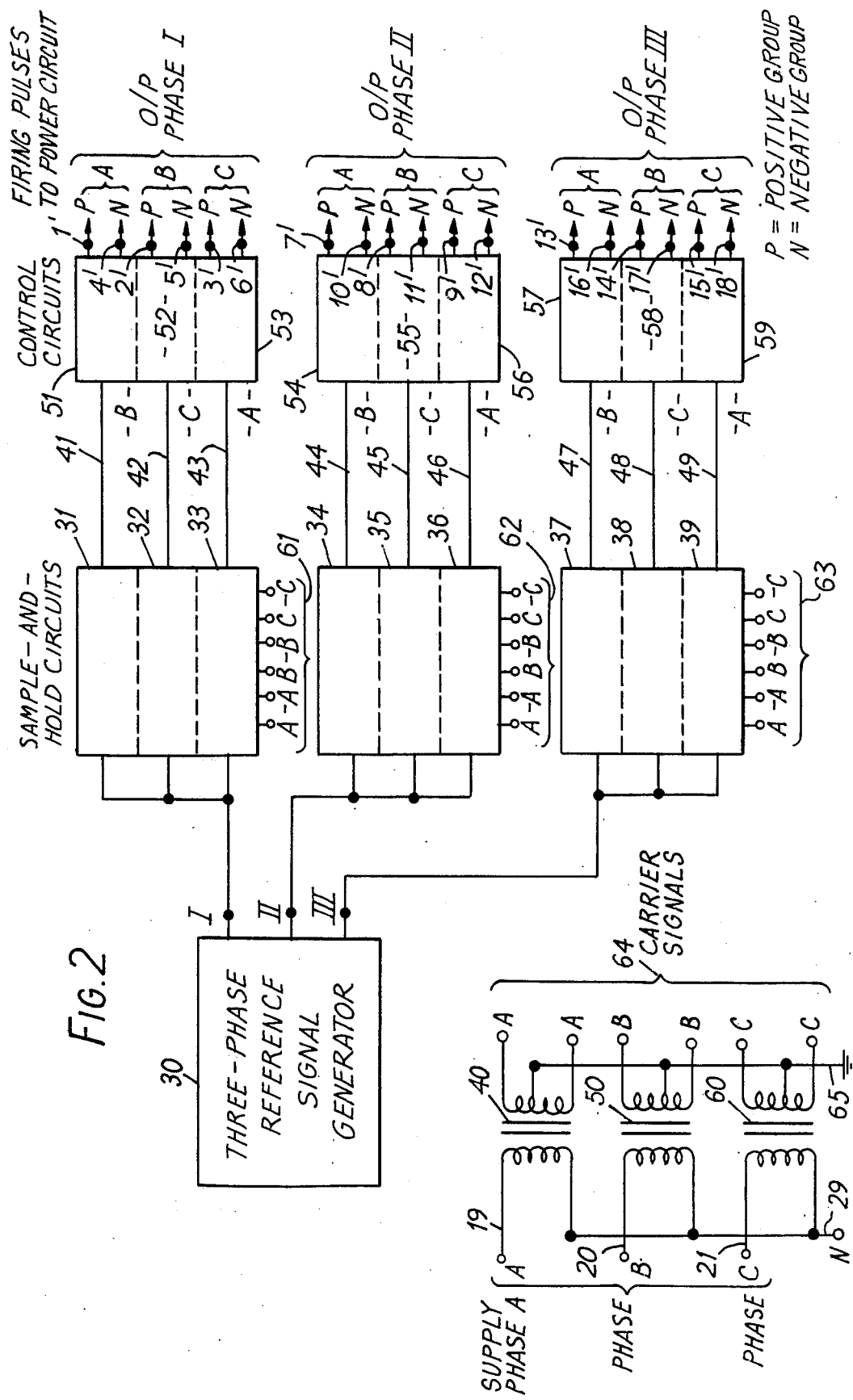
FIG. 2 is a diagram, mostly in block schematic form showing an arrangement according to the invention for regular sampling control of the cycloconvertor circuit of FIG. 1.

FIG. 2 is a circuit diagram, mostly in block schematic form, showing the general layout of the control circuitry for providing the firing pulses applied selectively to the thyristors 1 to 18 of FIG. 1.

Thus, in FIG. 2, a 3-phase, reference voltage generator 30 provides three sinusoidal voltages in 3-phase relationship at output terminals I, II and III. The voltage signals of the three output phases are sampled and held in groups of three sample-and-hold circuits 31, 32, 33; 34, 35, 36 and 37, 38, 39 for the three phases I, II and III respectively. Each reference signal is sampled in three ways, as is explained more fully later herein with reference more particularly to FIG. 7 of the drawings.

As shown in FIG. 2, however, the reference signal for phase I is supplied to circuits 31, 32 and 33 by which the reference voltage is sampled and the instantaneous value held, for supply by lines 41, 42 and 43 respectively to a corresponding group of three control circuits 51, 52 and 53, in which logic and timing circuits generate the corresponding firing pulses at terminal pairs 1', 4'; 2', 5' and 3', 6' each referenced, with a prime, correspondingly to the thyristor shown in FIG. 1, to the gate of which the particular series of firing pulses is applied.

Similarly for the phases II and III, the reference signals are each supplied to groups of three sample-and-hold circuits 34, 35, 36 and 37, 38, 39 respectively, to drive control signals supplied by lines 44, 45, 46 and 47, 48, 49 respectively, to control circuits 54, 55, 56 and 57, 58, 59 respectively. The output series of firing pulses at terminal pairs 7', 10'; 8', 11' and 9', 12', for phase II, and terminal pairs 13', 16'; 14', 17' and 15', 18', for phase III are supplied to control the correspondingly referenced thyristors of FIG. 1.

The sample-and-hold circuits 31 to 39 and the control circuits 51 to 59 themselves require carrier control signals derived from the 3-phase input supply on lines 19, 20, 21 and 29 of FIG. 1. To provide such carrier signals, three transformers 40, 50 and 60 have their primary windings connected in star between the neutral line 29 and the three phases respectively on lines 19, 20 and 21.

The centre-tap terminals of the three transformers 40, 50 and 60 are connected together and to the ground line of the control circuitry by line 65. The secondary terminals of the three transformers thus provide, in corresponding pairs, signal voltages corresponding respectively to A, −A; B, −B and C, −C of the three input phases, as grouped together within the bracket 64 in FIG. 2. These carrier signals are supplied to correspondingly referenced terminals grouped within the brackets 61, 62 and 63, for the three sample-and-hold circuits and the three control circuits corresponding to the output phases I, II and III, respectively.

The circuit arrangement of FIG. 2 may be compared with a conventional natural sampled cycloconverter, to which it is similar except for the added sample-and-hold circuits of the present arrangement.

The mode of operation of a cycloconverter using natural sampling will be described with reference to FIG. 3 and the manner of operation of the sample-and-hold circuits is described later herein.

Figure 3:
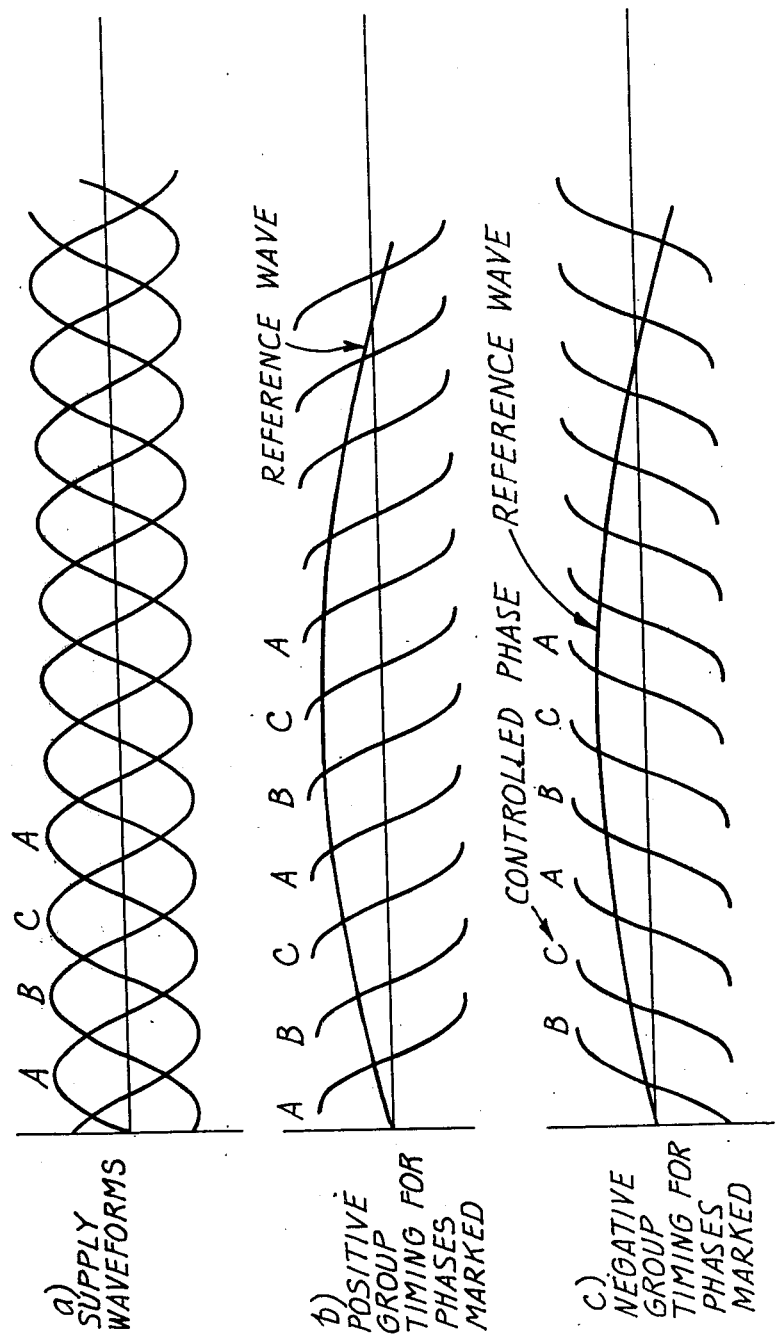
FIG. 3 is a diagram illustrating a known method of regular sampling.

Referring first to FIG. 3, there is shown, at the top of the figure referenced a, three sinusoidal waves corresponding to the 3-phase input supply A, B and C, as on lines 19, 20 and 21 of FIG. 1. In the centre of the figure, at b, is shown a first series of cosinusoidal half-waves, derived from the waveforms A, B and C at a. At the foot of the figure, at c is similarly shown a second series of cosinusoidal half-waves similarly derived. For each series, one full half-cycle of a corresponding reference wave is shown, the reference wave being obtained from one output, for example terminal I, of the signal generator 30 of FIG. 2. Hence, it will be understood that the waveforms of FIG. 3 relate to the control of one output phase, for example phase I of the arrangement of FIG. 1.

The technique of cosinusoidal control is based on the comparison of the reference wave and the corresponding series of cosinusoidal timing waves. The instants of intersection of the reference waves with the cosinusoidal waves determine the instants of switching for the appropriate thyristor of the power circuit. Thus, in FIG. 3, the groups referenced b and c relate respectively to the positive and the negative thyristor groups of the phase.

The initiation of the supply of firing pulses to a particular thyristor of a group occurs at the instants of intersection of the reference wave with the cosinusoidal timing waves for the supply phase corresponding to the particular thyristor of the group. Because of the limitations of natural commutation, the initiation of the supply of firing pulses to a particular thyristor, within either the positive or the negative group of a phase, can occur only during certain intervals. Each such interval is determined by the duration of a particular cosinusoidal wave.

For example, the supply of firing pulses to thyristor 1, FIG. 1, which is that thyristor of the positive group, phase 1, which is connected to supply phase A, can be initiated only in the interval determined by the duration of the cosinusoidal waves referenced "A" in FIG. 3b, and so on for the other two thyristors of the positive group and for the three thyristors of the negative group to which the waves of FIG. 3c relate.

Considering the generation of the cosinusoidal timing waves of FIG. 3, it will evident from b and c that the positive group half-waves of phase A and the negative group half-waves of phase A together form a continuous sinusoidal wave at the supply frequency. Similarly for the two groups of half-waves of supply phases B and C. These sinusoidal waves are provided by the three transformers 40, 50 and 60 of FIG. 2. Each wave is therefore supplied to the control circuits concerned to initiate the two thyristors connected to the same phase, one thyristor of the positive group and the other of the negative group.

Circuitry is therefore used which can initiate the supply of firing pulses to these thyristors at the instants of intersection of a sinusoidal wave and the reference wave. This is done in such a way that intersections of the reference wave and the positive-going part of the sinusoidal wave initiate the supply of firing pulses to the thyristor in the negative group, and intersections of the reference wave and the negative-going part of the sinusoidal wave initiate the supply of firing pulses to the thyristor in the positive group.

Figure 4:
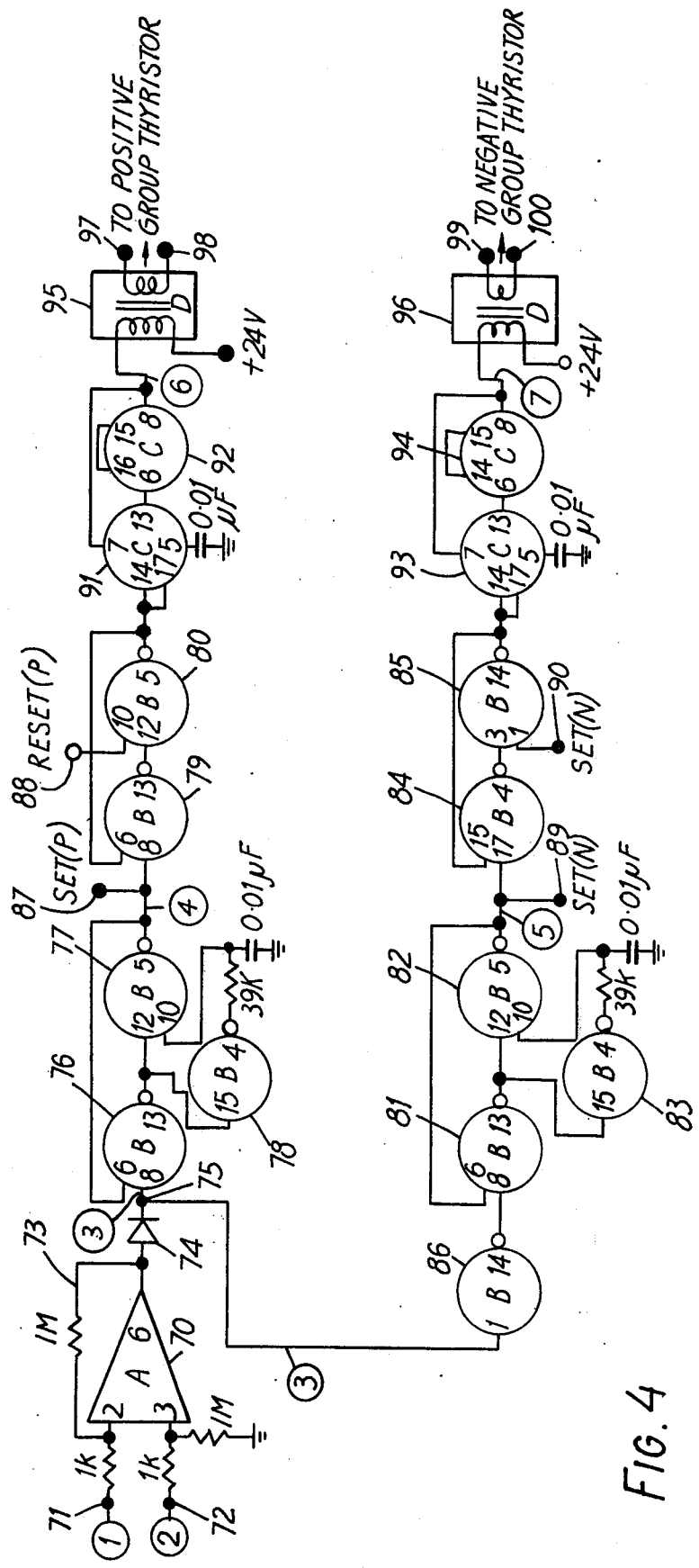
FIG. 4 is a schematic circuit diagram of a sampling circuit employing natural sampling for cycloconverter control.

FIG. 4 is a schematic circuit diagram showing one suitable circuit arrangement functioning in the manner required.

Figure 5:
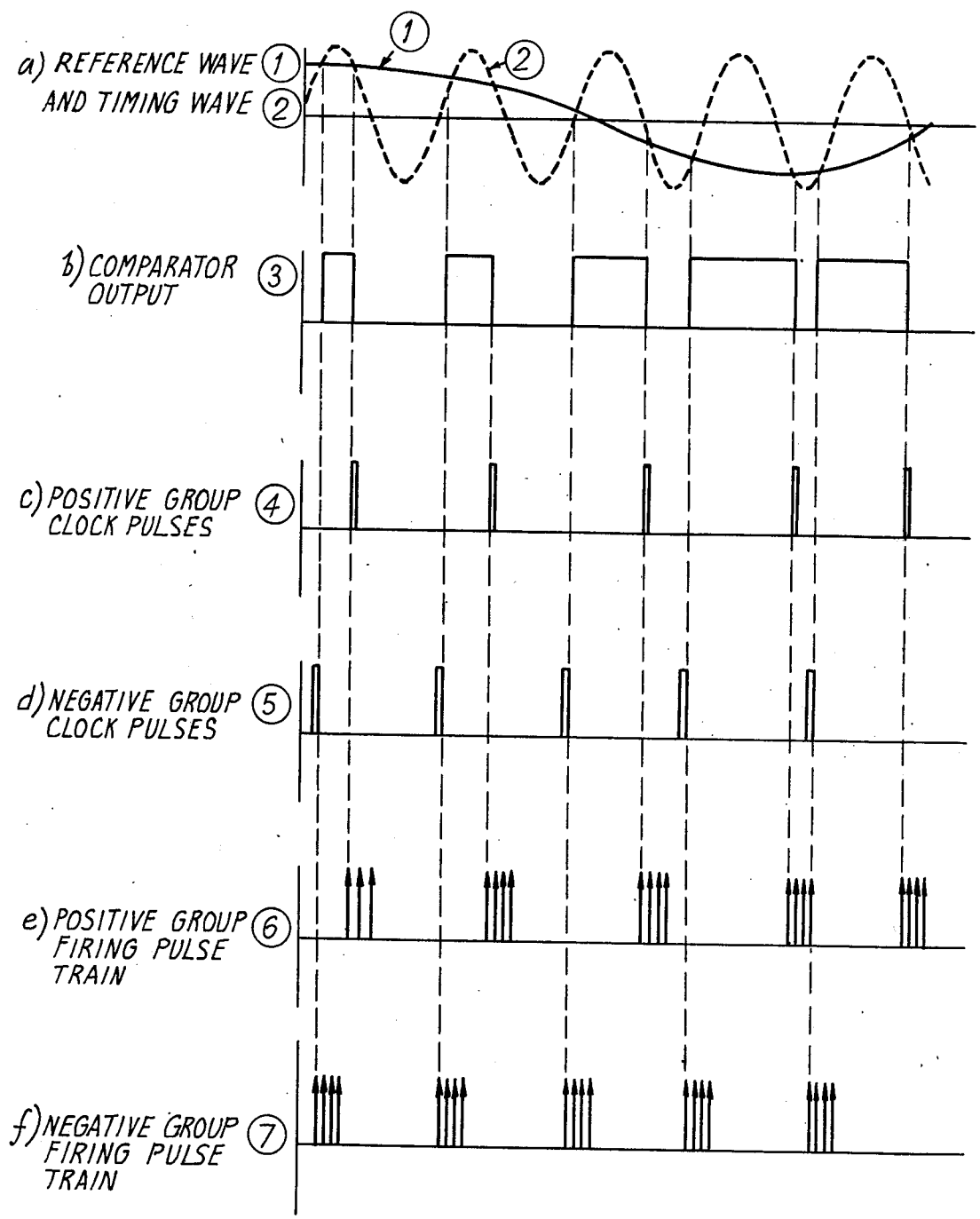
FIG. 5 is a diagram showing waveforms referred to in the description of natural sampling circuits of FIG. 4.

FIG. 5 shows, to a common time scale, the waveforms appearing at marked points in the circuit of FIG. 4.

In FIG. 4, the reference numbers in small circles refer to the waveforms similarly referenced in FIG. 5. The large circles denote commercially-available integrated circuit elements. The upper-case reference letter in each such element denotes the commercial element type as follows:

A. Mullard 741 operational amplifier;
B. Mullard 4NOR60 logic element;
C. Mullard UPA 61 Thyristor drive oscillator;
D. Mullard TT61 Thyristor output transformer.

The reference numerals within the circuit element symbols and adjacent a circuit connection thereto denote the pin to which the connection is made.

Considering FIG. 4 and FIG. 5 together, a high-gain operational amplifier 70 functions as a comparator of the signal generator reference wave and the input supply frequency timing waves referenced respectively (1) and (2) in the two drawings. To this end, these waves are supplied to input terminals 71 and 72, respectively and thence supplied, by way of series input resistors, to the two input terminals of the comparator 70. These input waves are shown in FIG. 5 at a.

The comparator 70 has negative feedback by way of line 73 and provides a unidirectional pulse output, by way of diode 74, at terminal 75. The output waveform (3) is shown at FIG. 5b. It will be noted that the comparator 70 changes state at the instants of intersection of the two waveforms.

The leading edge corresponds to the intersection with the positive-going part of the timing wave and the trailing edge corresponds to the intersection with the negative-going part.

Two groups of NOR logic elements 76, 77, 78, 79, 80 and 81, 82, 83, 84, 85 are connected as shown in FIG. 4, the latter group fed from terminal 75 by way of NOR element 86, are included to provide two series of clock pulses, the former group pulses referenced (4), see also FIG. 5c, corresponding to the trailing edges and the latter group pulses referenced (5), see also FIG. 5d, corresponding to the leading edges. These clock pulses define the instants at which firing pulses are required to be applied to the gates of the positive group thyristors and the negative group thyristors, respectively.

In the apparatus according to the invention, a modified reference wave, of step-form amplitude, derived from the sinusoidal wave (1) of FIG. 5a is used in place of the reference wave itself. The derivation and form of the modified reference wave is shown in FIG. 9, particularly FIG. 9d.

Just as in known cycloconverter apparatus the frequency and amplitude of the output supply are varied by changing the frequency and amplitude of the sinusoidal wave, so, in apparatus according to the invention, the frequency and amplitude of the output supply are varied by correspondingly varying the frequency and amplitude of the 3-phase reference waves, whereby the frequency and amplitude of the modified reference waves are varied similarly.

Referring again to FIG. 4, "Set Positive" pulses are provided at a terminal 87, connected between NOR elements 77 and 79 and "Reset Positive" pulses are provided at a terminal 88 connected to output pin "10" of NOR element 80. Similarly, from the second group of NOR elements, "Set Negative" pulses are provided at a terminal 89 and "Reset Negative" pulses at a terminal 90. These pulses are supplied to apparatus described with reference to FIG. 6.

The actual firing pulses for the two groups of thyristors, FIG. 1, are generated by two free-running oscillators, that for the positive group firing pulses (6) comprising elements 91 and 92, and that for the negative group firing pulses (7) comprising elements 93 and 94. The two groups of firing pulses (6) and (7) are shown in FIG. 5 at e and f respectively.

Isolation between the pulse circuitry of FIG. 4 and the power circuitry of FIG. 1 is provided by two pulse transformers 95 and 96, respectively, for the positive and negative group firing pulses, the respective series of pulses appearing between terminals 97, 98 and between terminals 99, 100.

Three circuit arrangements, such as that described with reference to FIG. 4, are used, to supply firing pulses to the six thyristors of one output phase, so that nine such circuit arrangements are used in all to control the three output phases.

Figure 6:
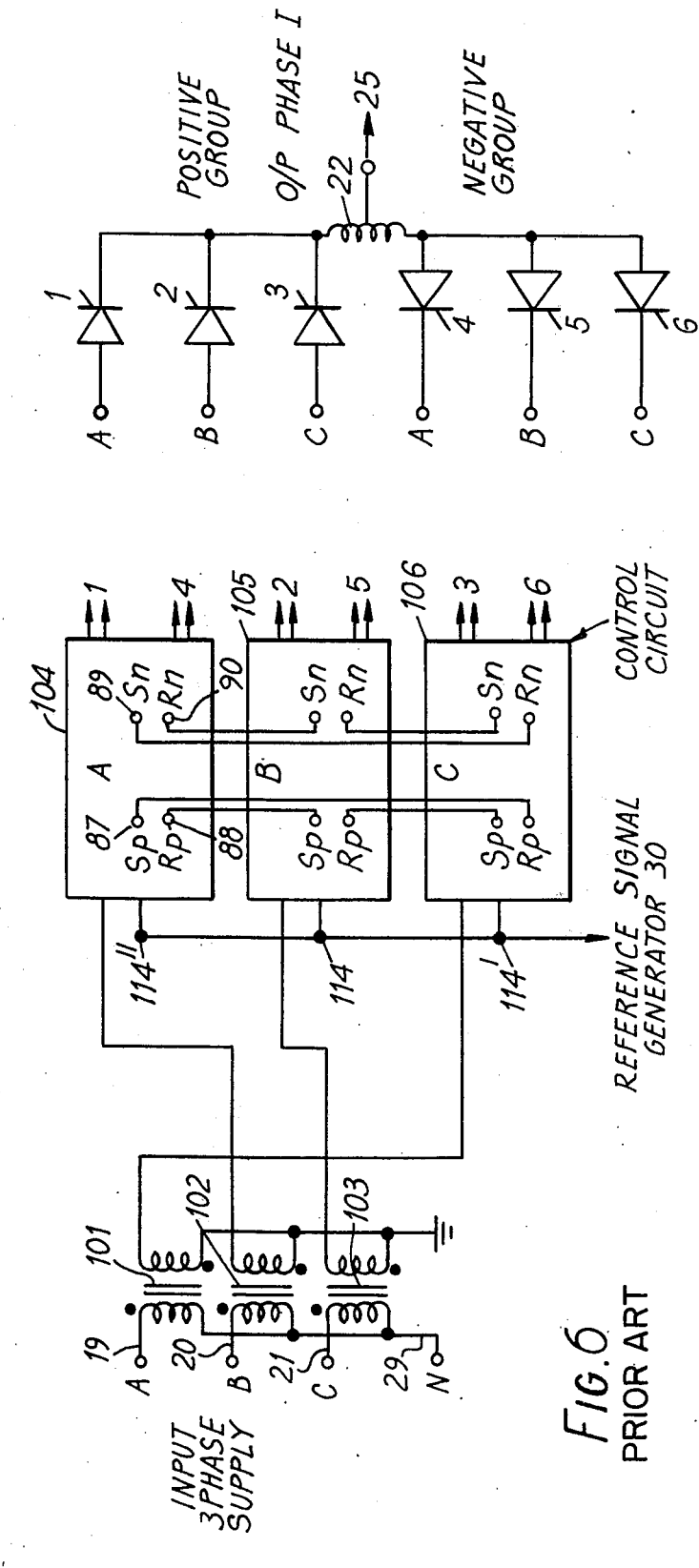
FIG. 6 is a diagram illustrating the schematic arrangement for natural sampling control of the cycloconverter.

Details of the thyristor control circuitry for one phase is shown in FIG. 6. The power circuit references correspond to phase I, FIG. 1.

Three transformers 101, 102, 103, have their primary windings in star-connection between the neutral line 29 and the three phase lines 19, 20, 21 of the input 3-phase supply. The secondary windings are star-connected between earth and three phase inputs to three control circuits units 104, 105, 106. These three units constitute a three-stage ring counter for the thyristor group of output phase I, to ensure that only one of the three thyristors of any group, positive or negative of a particular output phase, receives firing pulses at any one time, and further that the firing pulses, when so supplied, are continued throughout the full interval of conduction of that particular thyristor. To this end, a second input to units 104, 105 and 106 receives an input from the reference signal generator 30, FIG. 2. The "Set Positive", "Reset Positive", "Set Negative" and "Reset Negative" pulses from the NOR circuitry of FIG. 4 are supplied to correspondingly referenced terminals of unit 104, FIG. 6, and corresponding pulses from the NOR circuitry of the two other similar circuit arrangements relating to phase I are similarly supplied to units 105 and 106.

Firing pulses for the phase I thyristors 1 to 6 are supplied from output terminals correspondingly referenced 1,4; 2,5 and 3,6 of units 104, 105 and 106, respectively.

Thus, three circuit arrangements similar to that described with reference to FIG. 6, one for each of the output phases, are used to control the eighteen thyristors of the power circuitry of FIG. 1. These controlled from the 3-phase reference wave generator 30, FIG. 2, control the cycloconverter in the known mode of "natural sampling".

In order to provide apparatus which, in accordance with the present invention, controls the cycloconverter by "regular sampling", additional units are required to sample the magnitude of the three phase output waves of the reference voltage generator 30 at uniform intervals of time, and to hold the values of the samples; retaining a constant level corresponding thereto, until the next corresponding sample is taken. The output of this additional sample-and-hold circuitry is applied to control the apparatus of FIG. 6, in place of the signals derived from the reference signal generator 30 itself.

Figure 7:
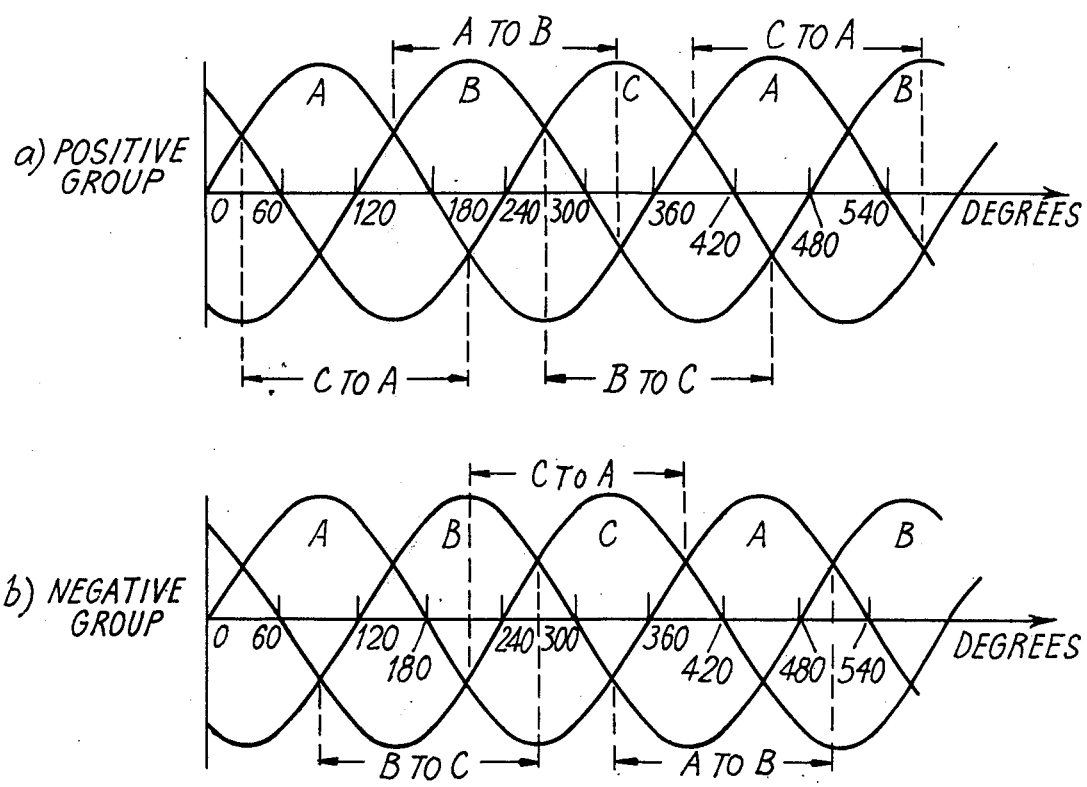
FIG. 7 is a diagram illustrating the commutating intervals of the 3-phase cycloconverter of FIG. 1.

Referring again to the known, natural sampling mode of operation described, and referring further to FIG. 7, it will be understood that the supply of firing pulses to any particular thyristor of the three thyristors of any one group, positive or negative, of any one output phase, can be initiated only during a particular interval of time in each cycle of that phase. This interval is known as the "commutation interval" and commutation intervals for the three input phases, for the positive and negative thyristor groups of a single output phase, are shown in FIG. 7.

Each such commutation interval is identified by a cosinusoidal wave. For example, the commutation interval for the thyristor of the positive group, for commutation from input phase C to input phase A, is the wave referenced A in FIG. 7*b*.

Considering the commutation interval of any one thyristor of either the positive group or the negative group of any one output phase, according to natural sampling, the firing instant of the particular thyristor is determined by the instant of intersection of the reference wave and the cosinusoidal timing wave concerned, see FIG. 3.

According to regular sampling, the sinusoidal reference wave value is replaced by a constant value which is determined by the instantaneous value of the sinusoidal reference wave at the commencement of the commutation interval concerned.

Referring to FIG. 7, this requires that the reference voltage wave for each output phase must be sampled at the commencement of each commutation interval and the value of the sample held as a constant value for 180° of the phase waveform. Thus, for the positive thyristor group, see FIG. 7*a*, samples must be taken at 30°, 150°, 270° and so on, and for the negative thyristor group, see FIG. 7*b*, samples must be taken at 90°, 210°, 330° and so on of the 3-phase output waveform, as shown.

The communtation intervals of the six thyristor groups of a 3-phase cycloconverter necessarily overlap one with another and it is therefore necessary to provide three separate sample-and-hold circuit arrangements for each output phase of the cycloconverter. Each sample-and-hold circuit can conveniently provide samples for both the positive and negative group thyristors connected to the same input phase, out of the six thyristors of any one output phase.

Referring again to FIG. 7, and considering, for both thyristor groups, the commutation intervals for commutation from phase C to phase A, a sample of the reference wave can be taken at 30° and the value held during 180° to 210° to provide a sample for commutation from phase C to phase A, for the positive group. The reference wave may again be sampled at 210° and the value held during 180° to 390° and used to provide a sample for commutation from phase C to phase A, for the negative group. The next sample, at 390°, is again held in value for 180°, for the positive group again, and so on.

These samples are supplied directly to the section of the control circuitry which provides firing pulses for the two thyristors, say of output phase I, which are connected to supply phase B. The control circuitry differentiates between the samples for the two groups in the usual way. Referring again to FIG. 7, it will be seen that the sampling instants for phase B are at 150° and at every 180° following and it will be seen that these instants correspond to every crossing point of the phase A and phase B supply waveforms. In order to define the sampling instants for phase B, it is necessary to detect these crossing points.

There are a number of ways of detecting every crossing point of the 3-phase supply waveforms taken in pairs. The preferred method is shown in the arrangement of FIG. 8.

Figure 8:
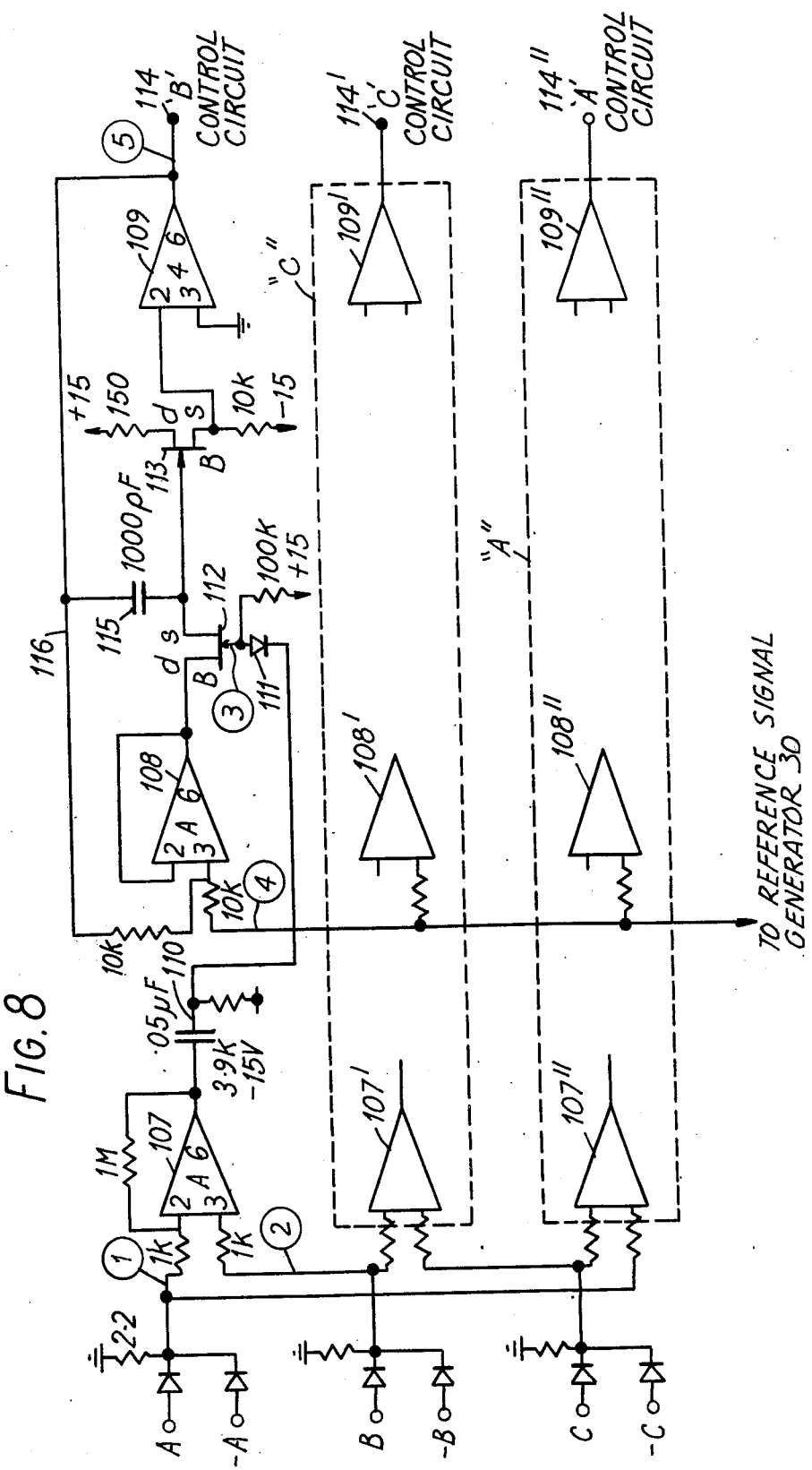
FIG. 8 is a schematic diagram of a sampling circuit employing regular sampling for cycloconverter control.

FIG. 8 is a schematic circuit diagram showing, in full, the circuit of one sample-and-hold arrangement for the two thyristors of one output phase connected to one supply phase, the arrangements for the other two pairs of thyristors of the same output phase being shown by broken-line boxes, "C" and "A".

In FIG. 8, the numbers enclosed in small circles refer to the waveforms shown in FIG. 9. The integrated circuit elements are identified as commercially-available types as follows:

A — 741 Operational Amplifier;
B — 2N 5458 field-effect transistor.

The numbers within the current elements A indicate the pin connections.

The method of operation of the circuit arrangement of FIG. 8, phase B consists in rectifying the supply waveforms by full-wave rectifiers, see the rectified waveforms (1) and (2) of FIG. 9*a* and feeding both to the high-gain operational amplifier 107. The output of the operational amplifier becomes alternately positive and negative at successive crossing points.

The output is differentiated by a resistance-capacitance network 110 and clipped by a diode 111 to generate a train of pulses (3), see FIG. 9b which define the instants at which the sinusoidal reference voltage for the phase has to be sampled. The reference voltage (4) is shown at FIG. 9c.

A second operational amplifier 108 for phase B is supplied with this reference waveform (4) from the signal generator 30. This amplifier 108 is connected in the unity feedback mode, in order to provide a buffer between the reference voltage signal generator 30 and the sample-and-hold stage of the circuit arrangement. The unity gain amplifier presents a very high impedance to the signal generator 30 and a very low impedance to the sample-and-hold stage, which ensures that the signal generator 30 is not overloaded so as to distort the reference waveform.

The output from the unity gain stage 108 is amplified and is fed to one terminal of a reservoir capacitor 115 by the field-effect transistor 112, which acts as a switching transistor switched by the sampling pulse waveform (3).

Whenever a sampling pulse is applied to transistor 112, the capacitance 115 is very quickly charged to the potential of the reference voltage at that sampling instant, due to the very low impedance of the circuit. The voltage on capacitor 115 becomes equal to the instantaneous value of the reference voltage at the sampling instant and it is this value which is required to be held constant until the next sampling instant.

To reduce leakage of the capacitor 115 charge, a good quality silver-mica capacitor is used and the input transistor to the capacitor and the output transistor from the capacitor transistors 112 and 113, respectively, are both field-effect transistors having a very high input impedance.

Transistor 113 is connected in the source-follower mode so as to provide a buffer between the capacitor 115 and amplifier 109. The input impedance of the source-follower stage is very high and therefore very little charge is lost from the reservoir capacitor between sampling instants so that the sampled voltage remains practically constant during this period.

The final stage of the phase B circuit is an output operational amplifier 109. The output of amplifier 109 is coupled to the input of amplifier 108 to ensure unity gain of the amplifying circuit overall. Grounding of the reservoir capacitor to the feedback link 116 increases the effective value of the reservoir capacitor. Leakage from this capacitor is compensated for by a "bootstrap" effect which ensures a nearly constant output voltage between samples. The operational amplifier 109 output at terminal 114 is held at this sampled value until the occurrence of the next following sampling pulse, thus providing the sampled reference step waveform (5), FIG. 9d. This waveform is supplied from terminal 114 to the second input of the "B" control circuit 105 of FIG. 6 instead of the signal generator reference signal as shown in FIG. 6. The "B" control circuit 105 provides firing pulses for thyristors 2 and 5 of the power circuitry, both thyristors being connected to phase B of the input supply, in the manner previously described.

Similar operational amplifiers 107', 108' and 109' are included in the identical circuit arrangement for phase C and similar operational amplifiers 107'', 108'' and 109'' are included in the circuit for phase A.

The waveforms of phase B and phase C are together supplied to the inputs of amplifier 107'. The waveforms of phase C and phase A are together supplied to the inputs of amplifier 107''. The reference waveform for the one output phase, phase I, is supplied from the reference voltage signal generator 30 to the amplifiers 108' and 108'', also.

The phase B, phase C and phase A circuits of FIG. 8 provide, at the outputs of amplifiers 109, 109' and 109'' respectively, samples to the control circuitry for all six thyristors of output phase I. Thus, output terminals 114, 114' and 114'' of FIG. 8 are connected to the correspondingly referenced input terminals of the control circuit units 105, 106 and 104, respectively, of FIG. 6, in place of the reference voltage itself, as is shown in that drawing. These units control all thyristors 1 to 6 of output phase I, as shown.

Nine separate sample-and-hold circuits, that is three triple arrangements as shown in FIG. 8, are required for all 18 thyristors of the power circuit of FIG. 1.

I claim:
1. A method of control of switching means for cycloconverter apparatus, for converting electrical power from an input, 3-phase alternating current supply of input frequency to an output, alternating current supply of output frequency different from said input frequency, said method comprising generating a sinusoidal reference wave of said output frequency for each phase of said output supply, sampling the amplitude of each said reference wave at the instants of amplitude equality of each pair of the input supply phases, storing the value of each sampled amplitude during the next following 180°, at supply frequency, to provide a modified reference wave of step-form amplitude, and providing a conduction initiating pulse for said switching means at each amplitude equality of each said modified reference wave and each input supply wave so as to control current conduction by said switching means and thus control the current flow from each of the input supply phases.

2. A method of control as claimed in claim 1, wherein said switching means comprise thyristors, said method further comprising deriving amplitude comparator output pulses extending during alternate intervals between successive instants of said amplitude equality, commencing thyristor firing pulses for negative half-cycles of said output supply from the leading edges of the said comparator output pulses, commencing thyristor firing pulses for positive half-cycles of said output supply from the trailing edges of the said comparator output pulses, and applying said thyristor firing pulses to said thyristors to render said thyristors conductive.

3. A method of control as claimed in claim 2, for varying the frequency and for varying the amplitude of the output supply, comprising correspondingly varying the frequency and amplitude of said generated sinusoidal reference waves.

4. Cycloconverter apparatus comprising input terminals for an input 3-phase alternating current supply of input frequency, output terminals for providing an output alternating current supply of output frequency different from said input frequency, a sine wave generator for generating a reference wave of said output frequency, for each phase of said output supply, first voltage comparator means for determining first instants of amplitude equality, of each input supply phase compared with each other supply phase, sampling means for sampling the voltage amplitude of each of said reference waves at said instants of equality of each pair of supply phases, voltage storage means for storing each sampled amplitude during the next following 180°; at supply frequency, thereby to provide a modified reference wave of step-form amplitude; switching means for controlling current flow from each of the input supply phases, for the negative half-cycles and for the positive half-cycles of each phase of the output alternating current, respectively, said switching means being controlled for current conduction by the application of firing pulses thereto, second voltage comparator means for determining second instants of amplitude equality, of each input supply phase and each said modified reference wave, and pulse generating means for generating firing pulses at said second instants of amplitude equality.

5. Cycloconverter apparatus as claimed in claim 4, comprising thyristor switching means, in which said second voltage comparator means provides output pulses of duration extending between alternate said second instants of amplitude equality and said pulse generating means generates firing pulse trains for said thyristors for said negative half-cycles commencing at the leading edges of said output pulses and generates firing pulse trains for said thyristors for said positive half-cycles commencing at the trailing edges of said output pulses.

6. Cycloconverter apparatus as claimed in claim 5, for a 3-phase output supply, having a 3-phase sine wave generator and having a total of 18 thyristors, each said thyristor being controlled for one half-cycle current flow, positive or negative, from one input phase and for one output phase.

7. Cycloconverter apparatus as claimed in claim 6, having three centre-tapped transformers with primary windings connected to said input terminals and centre-tapped secondary windings connected to supply to said first voltage comparator means two, 3-phase supply voltage waves, the second of reversed polarity with respect to the first, and the said first voltage comparator means including six high-gain operational amplifiers each supplied with one phase of the 3-phase reference wave and with one of said two, 3-phase supply voltage waves.

8. Cycloconverter apparatus as claimed in claim 7, in which the voltage storage means include capacitors for storing the reference wave voltage amplitudes.

9. Cycloconverter apparatus as claimed in claim 8, in which the said second voltage comparator means includes nine high-gain operational amplifiers, each supplied with one phase of the 3-phase reference wave and with both of said two, 3-phase supply voltage waves.

* * * * *